United States Patent [19]

Lagoutte

[11] Patent Number: 5,117,429

[45] Date of Patent: May 26, 1992

[54] PACKET SWITCH FOR A TRANSFER OF DATA IN ASYNCHRONOUS MODE IN A DIGITAL TRANSMISSION NETWORK

[75] Inventor: Pierre Lagoutte, Issy-Les-Moulineaux, France

[73] Assignee: LMT Radio Professinnelle, Boulogne Billancourt, France

[21] Appl. No.: 388,012

[22] Filed: Aug. 1, 1989

[30] Foreign Application Priority Data

Aug. 5, 1988 [FR] France ................. 88 10612

[51] Int. Cl.$^5$ ........................................... H04Q 11/04
[52] U.S. Cl. ....................................... 370/60; 370/94.1
[58] Field of Search ..................... 370/60, 94.1, 41

[56] References Cited

U.S. PATENT DOCUMENTS

| | | | |
|---|---|---|---|
| 4,603,416 | 7/1986 | Servel et al. | 370/60 |
| 4,698,802 | 10/1987 | Goke et al. | 370/60 |
| 4,796,254 | 1/1989 | van Baardwijk et al. | 370/60 |
| 4,823,340 | 4/1989 | Grassman et al. | 370/60 |
| 4,884,264 | 11/1989 | Servel et al. | 370/60 |
| 4,910,731 | 3/1990 | Sakurai et al. | 370/60 |

FOREIGN PATENT DOCUMENTS 0113639  7/1984  European Pat. Off.
0126196  11/1984  European Pat. Off.

*Primary Examiner*—Douglas W. Olms
*Assistant Examiner*—Dang Ton
*Attorney, Agent, or Firm*—Oblon, Spivak, McClelland, Maier & Neustadt

[57] ABSTRACT

The packet switch for asynchronous mode transfer in a transmission network is organized around a multiplexed bus which absorbs all the throughput. For this, the incoming trunk lines are connected to an 8-bit series/parallel adapter made with fast technology elements, followed by memory stacks associated with the incoming trunk lines, from which the pieces of data are removed at moderate speed in wider packets. A multiplexer transmits these pieces of data to the central bus. At this level, a centralized translation of the headers is done. Then the pieces of data are transmitted to the outgoing channels through a reversed structure, with output memory stacks restoring 8-bit words at moderate speed, and then an adapting circuit transmitting the series data at high speed to the outgoing arteries.

6 Claims, 2 Drawing Sheets

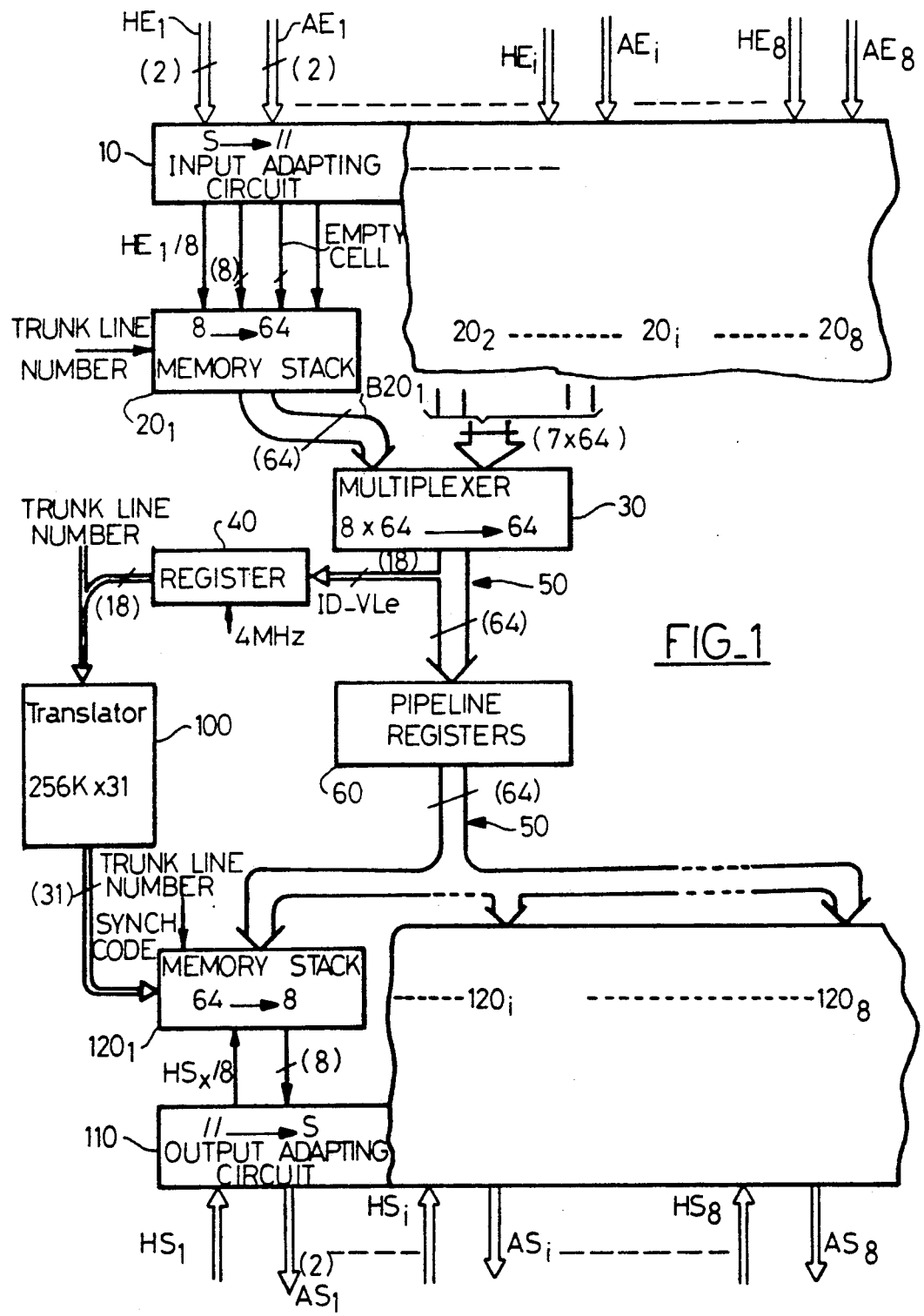

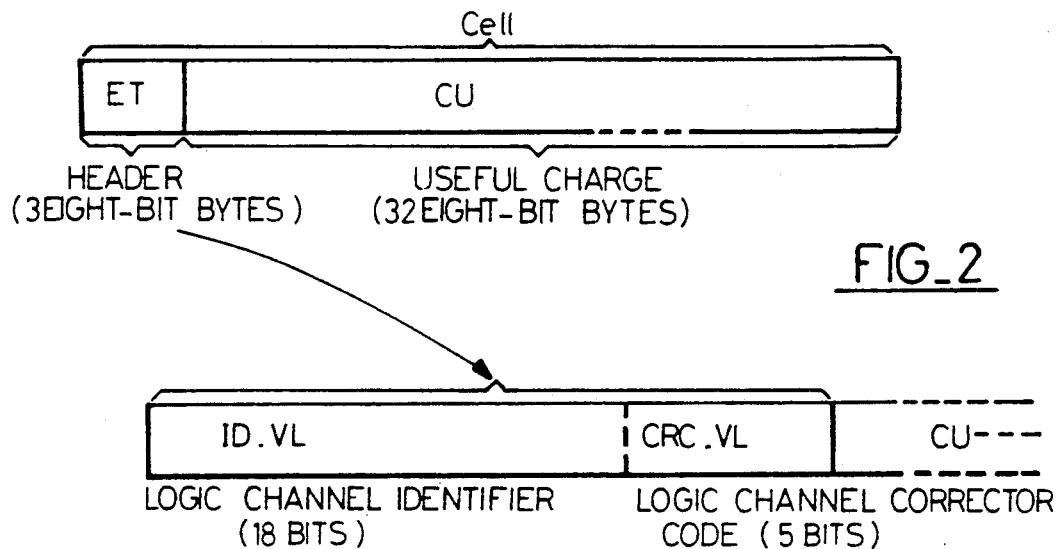
FIG_2
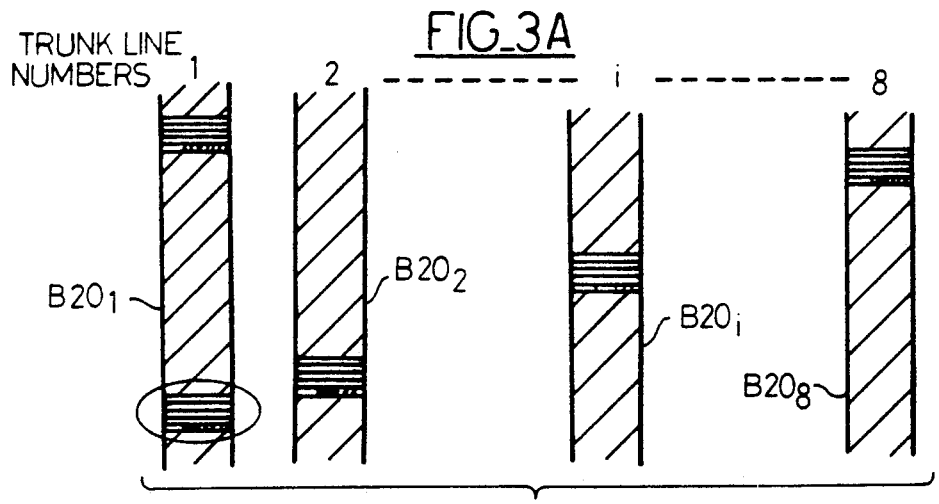
FIG_3A
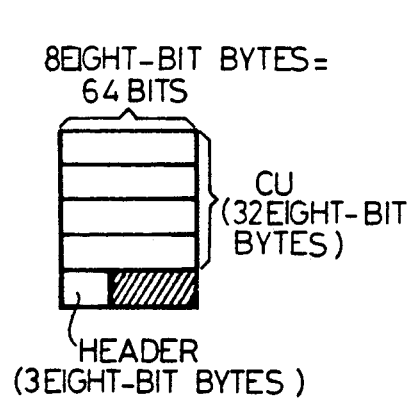
FIG_3B
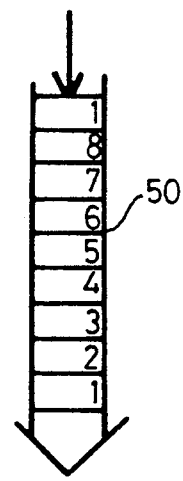
FIG_3C

PACKET SWITCH FOR A TRANSFER OF DATA IN ASYNCHRONOUS MODE IN A DIGITAL TRANSMISSION NETWORK

BACKGROUND OF THE INVENTION

1. Field of the Invention

The invention pertains to the field of telecommunications and, more particularly, to a packet switch for a transfer of data in asynchronous mode in a digital transmission network, which can be used notably in an integrated data services network designed for the transmission of data of different origins, at greatly differing throughput rates, the different services being capable of using data throughput rates that vary in a broad range. This system is commonly known as the "broadband ISDN" system.

2. Description of the Prior Art

In the option currently used for the transfer of data in networks such as this, the transfer is done in asynchronous mode, the data being transmitted in cells of fixed length comprising a header and a useful charge. At present, there is no broadband switch, namely one capable of absorbing very different throughput rates, which would work in asynchronous mode.

SUMMARY OF THE INVENTION

An object of the invention, therefore, is a fast packet switch adapted to data transfer in asynchronous mode, without obstruction, capable of absorbing all the throughput rates of the incoming trunk or main lines, and hence adapted to a great number of communications.

The invention proposes a packet switch for a transfer of data in asynchronous mode in a digital transmission network, designed for the interconnection of channels belonging to N trunk lines or main lines entering the switch to N trunk lines going out of the switch, said switch being structured around a single bus for the transfer of multiplexed data, said bus absorbing the totality of the throughput, said switch comprising, to this effect, upline of the transfer bus:

an input adapting circuit, connected to the incoming trunk lines, which converts the series data of the incoming trunk lines into data parallelized in n-bit packets;

N input shift memory stacks associated with the incoming trunk lines, the parallel inputs of which are connected to the corresponding outputs of the input adapting circuit, and the outputs of which transfer the memorized data in packets of nM bits on the single nM-bit bus through a multiplexer circuit;

and downline of the bus;

N shift memory stacks, connected to the bus, each having a n-bit parallel output;

and an output adapting circuit connected to the outputs of the memory stacks and transferring the serialized data on the outgoing trunk lines.

BRIEF DESCRIPTION OF THE DRAWINGS

The invention will be better understood, and other characteristics will appear, from the following description, made with reference to the appended drawings, wherein:

FIG. 1 is a functional diagram of the switch according to the invention;

FIG. 2 illustrates the constitution of the cells transmitted;

FIG. 3 illustrates the transfer on a multiplexed, single bus according to the invention.

DESCRIPTION OF THE PREFERRED EMBODIMENT

To overcome the above-mentioned problem, the packet switch for data transfer in asynchronous mode, with upline centralized translation, according to the invention, is structured around a single, moderate speed, data transfer bus, absorbing the entire throughput.

FIG. 1 shows the switch according to the invention, designed to connect incoming trunk lines $AE_i$ i=1 to 8 for example, to outgoing trunk lines, $AS_i$, i=1 to 8, each associated with its clock signal $HE_i$ or $HS_i$. The trunk lines entering the switch, capable of transmitting data at a high throughput rate of 150 Mbits/s at the maximum, are connected to an input adapting circuit 10 made using fast technology, parallelizing the pieces of incoming series data to transmit them in the form of 8-bit words in parallel. This pre-diffused circuit also detects the synchronization codes and, using the external clock signal $HE_i$, associated with a transmission trunk line, it gives a corresponding clock signal for the output of the 8-bit words $HE_i/8$. Finally, this input circuit 10 also gives an "empty cell" indicator bit when no data is transmitted.

The speed is thus reduced, and the next logic level can be made with moderate speed technology. The parallel data coming from the input adapting circuit 10 is thus transmitted to circuits having memory stacks, respectively associated with the different trunk lines $20_1$, ... $20_i$ ... $20_N$, N being the number of incoming trunk lines receiving the number of the corresponding incoming trunk line. To preserve this moderate speed on the single transfer bus 50, the pieces of data are removed from the memory stacks $20_i$ in wider packets, namely 8M, for example 64 bits, where M is a whole number. For the transfer on the single bus 50, the outputs on 64 bits of each of the memory stacks $20_i$ are therefore connected to the inputs of a temporal multiplexer 30 which successively transfers the data coming from the different memories $20_i$ to the single transfer bus 50.

To understand how the transfer is made on the single bus 50 through the multiplexer 30, the structure of the data cells is shown in FIG. 2. Each cell, which has a pre-determined whole number of 8-bit words, is formed by a header comprising, notably, the logic channel identifier, and a useful charge which has the data to be transmitted. The length of the header may be from 3 to 8 8-bit words, while the length of the useful charge may be from 32 to 120 8-bit words, for example. However, once the characteristics of the network are fixed, these numbers are the same at all points of the network. FIG. 3 shows a header with three 8-bit words and a useful charge with 32 8-bit words. The header consists of the logic channel identifying code and a logic channel corrector code, respectively ID.VL and CRC.VL. Consequently, one cell in this configuration comprises 35 8-bit words.

If we return to FIG. 1, since the pieces of data are transferred in 64-bit packets on the single transfer bus, a cell will be memorized or stored in the input memory stack $20_i$ in a memory zone with five times 8 8-bit words, namely 40 8-bit words, 5 empty 8-bit words followed by 3 header 8-bit words in the first 64-bit zone, then the 32 8-bit words distributed in four groups of 8 8-bit words in the 64-bit memory zones. A cell will therefore be transferred on the single bus in 5 consecutive clock pulses at 20 MHz, for example, before the temporal multiplexer 30 switches over to another memory stack $20_{i+1}$. In addition to the memory function, the circuits $20_i$ fulfil the function of checking the logic channel corrector codes CRC.$VL_e$ and perform a reset in the event of error. The management of these input memories is also done in these circuits, with the removal of the empty cells (in 64-bit packets) and the transfer on the single output bus, with zero-setting for the empty cells, i.e. those corresponding to an empty cell indicator at 1.

This transfer is illustrated in FIG. 3 which shows the output bus $B20_i$ of the memory stacks $20_i$, and the corresponding, transferred data packets, and their sequence in the single bus 50.

The centralized translation is performed at this level. For this purpose, the bits of the header forming the incoming logic channel identifier ID.$VL_e$, namely 18 bits in the configuration shown in FIG. 2, are transmitted to a register 40, controlled by a clock signal at a frequency of 20/5 MHz, i.e 4 MHz. These bits are transferred to a translator 100 which also receives the number of the incoming trunk line at the instant considered, from a micro-controller or from a data-processing bus designed to control the switch (not shown). The translator 100, which is actually a memory table with a capacity of $32 \times 2$ Mbits, uses these pieces of data to give the following, from the identifier of the incoming logic channel: the identifier of the outgoing logic channel ID.$VL_s$ on 18 bits, the associated corrector code CRC.$VL_s$ on 5 bits and the trunk line selection indicator, an active bit on the 8 trunk lines respectively associated with the 8 outgoing trunk lines, or several active bits in the event of distribution on several outgoing trunk lines. These 31 bits are transmitted to circuits comprising output memory stacks $120_1 \ldots 120_i \ldots 120_8$ at the same time as the single bus 50 is connected to the data inputs of these memories, through a stack of pipeline registers 60, making it possible to absorb the delay introduced by the translator. The number of the outgoing trunk line and the corresponding synchronization code are also applied to these output memory stacks $120_i$ which, therefore, receive the data designed to be transmitted on the trunk line associated with them. These pieces of data, received in 64-bit packets at the 20 MHz rate, are restored in the form of 8-bit words at 20 MHz on the corresponding trunk line. The output memory circuits $120_i$ therefore have the following functions (also wired) available, in addition to their memory function:

recognition of the marking instruction by the trunk line or lines selection indicator on 8 bits;

insertion of the identifiers of outgoing logic channels ID.$VL_s$ and of the associated corrector codes CRC/.$VL_s$, in the cells to replace the identifiers, and of the associated corrector codes of the incoming logic channels;

management of the output memory zones;

insertion, as the case may be, of empty cells;

conversion of 64-bit packets into sequences of 8-bit words.

These 8-bit words are then transmitted to an output adapting circuit 110 which performs the 8 bits parallel/series conversion, and therefore transmits the series data at the maximum rate of 150 MHz on the corresponding outgoing trunk line. To this effect, the outgoing adapting circuit receives the external clock signals $HS_1$ from the outgoing trunk lines for the output of the series bits, and uses these clock signals to give the corresponding clock signals for the output of the 8-bit words $HS_i/8$ to the output memory circuits $120_i$.

The above functional description introduces the physical description related to it:

The input and output adapting circuits 10 and 110 can be made on a single pre-diffused circuit using fast technology, i.e. using ECL 100K or BICMOS technology, capable of working at throughput rates compatible with this application, i.e. up to a maximum of 150 MHz. The circuits with input and output memory stacks can be made using moderate speed technology, for example with 20 MHz CMOS technology, for example with 90-pin packages for the stacks with input memory stacks and 120-pin packages (or sets of two 75-pin packages) for the circuits with output memory stacks.

The above description has been given for 8 incoming trunk lines and 8 outgoing trunk lines, but an advantage of this structure is that it can be adapted without any change in architecture and with optimal adaptation (homothetic structure) to smaller sized switches, for example for four incoming trunk lines and 4 outgoing trunk lines. The size of the translator could then be limited to 256 K $\times$ 31 since the logic channel identifier may be reduced to 15 binary elements. The number of memory stacks is obviously adapted to the number of trunk lines, namely 4 for the input memory stacks and 4 for the output memory stacks, the multiplexer then performing a multiplexing operation of 4 times 64 bits at 64 bits. The architecture thus enables easy depopulation through the removal of trunk lines Although conceived for 8 trunk lines, it can be adapted without any difficulty to 4 trunk lines. As indicated above, this structure also enables distribution: several outgoing channels belonging to different outgoing trunk lines (1 per trunk line at the most) may receive the same incoming channel. Its modularity is also an advantage to reduce costs to the minimum, in adapting the technology used for each module precisely to what is necessary.

Of course, the invention is not limited to the precise embodiment that has been described. It is clear that, for a transfer of data in asynchronous mode using longer cells, the multiplexing of the corresponding channels would have to be adapted to the size of the cells. Similarly, the transfer in asynchronous mode uses cells formed by a pre-determined whole number of 8-bit words. This is why the input adapting circuit (and reciprocally, the output adapting circuit) parallelize the data in 8-bit words. However, the parallelization could be done differently, for example in series/16 bit packets, if this form should be more suitable for technological reasons.

What is claimed is:

1. In a digital transmission network, a packet switch for transferring, in an asynchronous mode, data from N incoming trunk lines to N outgoing trunk lines, each of said trunk lines having a respective input clock signal associated therewith, the switch comprising:

an input adapting circuit, connected to the N incoming trunk lines, for converting series data, carried by the N incoming trunk lines at a rate of about 150 Mbits/s, into parallel data of n-bit packets and for producing a first memory stack clock signal for each of said n-bit packets;

N input shift memory stacks, respectively associated with the N incoming trunk lines, having parallel inputs connected to corresponding outputs of the input adapting circuit and outputs for outputting stored data in packets of n times M bits, wherein M is a whole number, and using respective ones of said first memory stack clock signals;

a multiplexer circuit for successively outputting the stored data, from each of the N input shift memory stacks, in packets of n times M bits;

a single transfer bus for transferring all data transferred by the switch and for receiving the data outputted by the multiplexer in packets of n times M bits;

N output shift memory stacks respectively connected to the single transfer bus, each having a n-bit parallel output; and an output adapting circuit connected to the outputs of the N output shift memories for converting parallel data received from the N output shirt memories to series data and for transferring the series data to the N outgoing trunk lines;

wherein said output adapting circuit receives a respective output clock used for said transferring of said series data and produces a second memory stack clock signal for a respective one of said N output shift memories;

wherein the input and output adapting circuits are one of an emitter coupled logic and a bipolar complementary metal oxide semiconductor integrated circuit which operate at a rate of about 150 Mhz; and wherein the input and output shift memory stacks are complementary metal oxide semiconductor circuits which operate at a rate of about 20 MHz.

2. A switch according to claim 1, comprising a translator, performing an upline controlled centralized translation, coupled to the output of the multiplexer on the single transfer bus, to take bits associated with identifiers of incoming logic channels and translate them into identifiers of outgoing logic channels, corresponding output of the translator being also connected to the inputs of the N output memory stacks, a pipeline memory being placed in the transfer bus to introduce the delay, in the data, needed for the working of the translator.

3. A switch according to claims 1 or 2, wherein the input adapting circuit and the output adapting circuit are made using a fast technology integrated circuit.

4. A switch according to claim 3, wherein the input and output shift memory stacks are made in integrated circuits, using moderate speed technology.

5. A switch according to claim 1, wherein the number N of incoming and outgoing trunk lines is equal to 8.

6. A switch according to claim 1, wherein the series data are parallelized in 8-bit words, n=8, in the input adapting circuit, then transferred in 64-bit packets, M=8, the single data transfer bus being a 64-bit bus.

* * * * *